United States Patent
Hess (10) Patent No.: US 9,626,198 B2
(45) Date of Patent: Apr. 18, 2017

(54) USER INTERFACE FOR A VEHICLE SYSTEM

(75) Inventor: Wolfgang Hess, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 106 days.

(21) Appl. No.: 13/229,279

(22) Filed: Sep. 9, 2011

(65) Prior Publication Data

US 2012/0065815 A1 Mar. 15, 2012

(30) Foreign Application Priority Data

Sep. 9, 2010 (EP) .................................... 10176068

(51) Int. Cl.
G06F 9/44 (2006.01)
B60K 37/00 (2006.01)
B60K 37/06 (2006.01)

(52) U.S. Cl.
CPC ............ *G06F 9/4443* (2013.01); *B60K 37/00* (2013.01); *B60K 37/06* (2013.01); *B60K 2350/1004* (2013.01); *B60K 2350/1032* (2013.01); *B60K 2350/35* (2013.01); *B60K 2350/357* (2013.01)

(58) Field of Classification Search
CPC . G06F 7/00; G06F 9/4443; B60K 2350/1004; B60K 2350/1008; B60K 2350/1016; B60K 2350/1028; B60K 2350/355; B60K 2350/357; B60K 2350/35; B60K 2350/1032; B60K 37/00; B60K 37/06
USPC ............... 701/2, 36, 418, 487, 538
See application file for complete search history.

(56) References Cited

U.S. PATENT DOCUMENTS

| 7,224,262 | B2 * | 5/2007 | Simon et al. ............ 340/426.13 |
| 2005/0107928 | A1 * | 5/2005 | Mueller .......................... 701/33 |
| 2005/0282532 | A1 * | 12/2005 | Dotan et al. ................. 455/418 |
| 2006/0155431 | A1 * | 7/2006 | Berg et al. ........................ 701/2 |
| 2008/0065274 | A1 * | 3/2008 | Taki et al. ........................ 701/2 |

(Continued)

FOREIGN PATENT DOCUMENTS

| JP | 2000-076155 A | 3/2000 |
| JP | 2003015668 A | 1/2003 |

(Continued)

OTHER PUBLICATIONS

Eichhorn et al., "A SOA-based middleware concept for in-vehicle service discovery and device integration", Intelligent Vehicles Symposium (IV), 2010 IEEE, IEEE, Piscataway, NJ, USA, Jun. 21, 2010, pp. 663-669.

(Continued)

*Primary Examiner* — Patrick Hawn
(74) *Attorney, Agent, or Firm* — Brooks Kushman P.C.

(57) ABSTRACT

A vehicle computing device and a method of providing a user interface to a vehicle system to control at least one function of the vehicle system are provided. The vehicle computing device communicates with a mobile client device over a wireless data connection. At the vehicle computing device, control instructions are provided. The control instructions comprise instructions for displaying at least one graphical control element at the client device to control the at least one function of the vehicle system. The vehicle computing device can be configured to transmit the control instructions to the client device over the wireless data connection.

13 Claims, 4 Drawing Sheets

(56) References Cited

U.S. PATENT DOCUMENTS

| | | | |
|---|---|---|---|
| 2009/0240427 A1 | 9/2009 | Siereveld et al. | |
| 2010/0097239 A1 | 4/2010 | Campbell et al. | |
| 2010/0180330 A1 | 7/2010 | Zhu et al. | |
| 2010/0268401 A1* | 10/2010 | Blakemore et al. | 701/2 |
| 2011/0060480 A1* | 3/2011 | Mottla et al. | 701/2 |
| 2011/0071734 A1* | 3/2011 | Van Wiemeersch et al. | 701/49 |
| 2011/0208834 A1 | 8/2011 | Nagano et al. | |
| 2011/0234427 A1* | 9/2011 | Ingram et al. | 340/995.1 |
| 2011/0257973 A1* | 10/2011 | Chutorash et al. | 704/235 |

FOREIGN PATENT DOCUMENTS

| | | |
|---|---|---|
| JP | 2004279989 | 10/2004 |
| JP | 2010-181946 A | 8/2010 |
| WO | 2009130840 | 3/2009 |

OTHER PUBLICATIONS

Munson et al., "The XVC Framework for In-Vehicle User Interfaces", 2007 IEEE International Conference on Pervasive Computing and Communications Workshops, IEEE, Los Alamitos, CA, USA, Mar. 1, 2007, pp. 435-442.

Sonnenberg, "A distributed in-vehicle service architecture using dynamically created web services", Consumer Electronics (ISCE), 2010 IEEE 14th International Symposium on, IEEE, Piscataway, NJ, USA, Jun. 7, 2010, pp. 1-5.

Amditis et al., "Towards the Automotive HMI of the Future: Overview of the AIDE-Integrated Project Results", IEEE Transactions on Intelligent Transportation Systems, IEEE Service Center, Piscataway, NJ, US, vol. 11, No. 3, Sep. 1, 2010, pp. 567-578.

Gil-Castineira et al., "Integration of nomadic devices with automotive user interfaces", IEEE Transactions on Consumer Electronics, IEEE Service Center, New York, NY, US, vol. 55, No. 1, Feb. 1, 2009, pp. 34-41.

Extended European Search Report for corresponding Application No. 10176068.4, mailed Apr. 5, 2011, 11 pages.

Japanese office action for JP 2011-192773 dated Jun. 9, 2015.

Chinese office action for CN201110266776.4 dated Jul. 2, 2015.

Office action and English translation for corresponding Japanese patent application JP2011-192773 dated Mar. 15, 2016, 7 pages.

Office Action for corresponding Chinese patent application CN201110266776.4, mailed Feb. 23, 2016, 6 pages.

Japanese Office Action and English translation for corresponding Application No. 2011-192773, dated Nov. 25, 2016, 8 pages.

* cited by examiner

USER INTERFACE FOR A VEHICLE SYSTEM

CLAIM OF PRIORITY

This patent application claims priority from EP Application No. 10 176 068.4 filed Sep. 9, 2010, which is hereby incorporated by reference.

1. Field of Technology

The present invention relates to the field of vehicle computing devices, and in particular to a user interface for use in a vehicle system.

2. Related Art

Modem vehicles often comprise a plurality of vehicle electronic systems, ranging from a navigation system over multimedia systems, such as a radio, MP3 and DVD player, communication systems, such as a mobile communication system or an inter-passenger communication system, to systems providing telemetry data, e.g., relating to fuel consumption, driving performance or the like. Some of these systems can be provided in a single device or may at least make use of a common computing device provided in the vehicle. Such a computing device can for example be a so-called "head unit", an infotainment system or the like. Such devices generally comprise a microprocessor, memory, and other computing components, so that they essentially correspond to a fully functional computer. They can interface or comprise further components required by the implemented vehicle systems, such as a GPS sensor, a cell phone transceiver, and the like. The computing device generally also provides a user interface by which a user can control the vehicle systems. Such a user interface can comprise a display mounted in the center console of the dashboard and control elements mounted adjacent to the display or at any other position inside the vehicle, e.g., on the vehicle's center console above the transmission tunnel For providing detailed information, such as maps, the display needs to have a considerable size. Due to the number of systems that need to be controlled and the number of functions of these systems, a correspondingly large number of mechanical controls, such as turn and push buttons, is required. User interfaces accordingly take up a considerable amount of space in the vehicle, with the display and the controls covering most of the center control. Such user interfaces are also not user friendly, since the position and angle of the display and the positioning of the control elements can generally not be adjusted. The large number of control elements is often confusing to operate, and the driver also needs to memorize their function and position. If the driver does not, he needs to look up the control elements resulting in a distraction of the driver from traffic. Systems in which a plurality of functions are operated by a single control element similarly result in confusion and driver distraction, as the selection or adjustment of a function generally requires the driver to browse through a considerable number of sub-menus and to focus on the display of the computing device.

As the display is generally fixed to the computing device (e.g., the head unit) the computing device needs to be mounted in the dashboard, at a fixed and visible position. This results in such devices being prone to theft. As the device requires a display and the mechanical control elements, it is also relatively expensive to produce.

Accordingly, there is a need to improve the control of vehicle systems by a user, in particular to improve the user interface, and to obviate at least some of the drawbacks mentioned above.

SUMMARY OF THE INVENTION

A vehicle computing device provides a user interface to a vehicle system to control at least one function of the vehicle system. The vehicle computing device comprises a transceiver in wireless communication with a mobile client device over a wireless data connection and a processing unit adapted to communicate with the mobile client device via the transceiver. The processing unit receives a request from the client device via the wireless data connection, to provide user interface data for controlling the at least one vehicle system, and transmits control instructions via the wireless data connection to the client device. The control instructions comprise instructions for displaying at least one graphical control element at the client device for controlling the at least one function of the vehicle system. The control instructions are configured such that they can be interpreted by a platform independent application running on the client device. The processing unit receives input data from the client device comprising a detected user input corresponding to an actuation of the graphical control element detected by the client device and providing the received user input to the vehicle system, thereby enabling the control of the function of the vehicle system by means of the client device.

As the client device can be used as a user interface for the at least one vehicle system, and also for the vehicle computing device, no additional user interface needs to be provided. Notably, the vehicle computing device does not need to be equipped with a display and mechanical control elements for enabling a user to interact with one of the vehicle systems. By configuring the control instructions as mentioned above, the computing device may also enable any type of mobile client device running the platform independent application to operate as a user interface. Accordingly, there is no need to adapt the control instructions to a particular type of system specific to the mobile client. As the vehicle computing device itself does not need to be equipped with a user interface, it can be placed at any suitable position inside the vehicle, thus freeing space in the center console and dashboard. The computing device may also be mounted at a position hidden from or in inaccessible to a user, thus reducing the risk of theft.

The mobile client device may be mounted at any position inside the vehicle in accordance with the user's desires and needs. The user can further choose which type of mobile client device to use, and as a result a flexible user interface is provided. The use of more than one client device is possible. When the user interface is updated at the computing device at a certain update time, different client devices can receive the updated control instructions and accordingly can provide an updated interface. There is thus no need to update each client device separately. Multi-client scenarios are also conceivable, e.g., with one client device provided in the front and another one in the rear of the vehicle.

In an embodiment, the control instructions define a structured document, e.g., a document comprising infatuation to be displayed or given out and further computer-readable instructions defining the structure and presentation of the information.

In particular, the control instructions transmitted to the client device may be configured to define the contents of a web page, e.g., according to the HTML5 standard. The platform independent application running on the client device can be a web browser. A web page is both capable of displaying all types of graphical control elements and static and dynamic information, so that by providing control instructions defining a web page to the client device a flexible and dynamic user interface may be generated. Furthermore, as most mobile client devices, such as for example smartphones, personal digital assistants (PDAs), internet-enabled mobile phones, tablet computers, laptop computers, media players, or the like, generally comprise a web browser application running thereon, any of these devices may be used to receive the control instructions and to provide the user interface for the vehicle system. In particular, the control instructions do not need to be adapted to the particular type of device, and the device itself may not need to be modified for acting as a user interface.

The vehicle computing device may further comprise a web server operated by the processing unit, the control instructions defining the contents of a web page provided by the web server. The control instructions may thus be retrieved by the client device via a web client. The web server operated at the vehicle computing device may be a Hybrid Text Transfer Protocol (HTTP) server.

The request received from the client device may comprise a request message from the platform independent application, such as a web client, or a web browser, operated on the client device to the web server. The control instructions transmitted to the client device may be comprised in a response message from the web server to the web client of the client device. Operating the user interface may thus correspond to browsing a web page via the web client on the client device.

The vehicle computing device may dynamically generate the control instructions, e.g., the structured document or web page. As an example, information to be given out to the user may be received from the vehicle system, and the received information may be included in the control instructions to be transmitted to the client device. In particular, control instructions for displaying the received information at the client device can be provided, for example control instructions defining an object and/or an image embedded in the structured document or web page. Dynamic information, such as a current map of a navigation system, current audio or video settings of a multimedia system, multimedia contents, telemetry data of the vehicle or the like may be given out at the client device.

The computing device may be configured to retrieve a template of a web page or a structured document (e.g., from a memory of the computing device) into which the information received from the vehicle system can be included so as to dynamically generate the structured document or web page. The dynamic generation of the control instructions may be based on a user input received from the client device. The user may thus be enabled to define the layout of the user interface. Furthermore, information on the capabilities of the client device may be received on the wireless data connection from the client device, and the control instructions may be generated in accordance with the received client device capabilities.

In a particular example, the control instructions may define menu items and submenu items for controlling functions of the at least one vehicle system. The control instructions may also define different tabs of a structured document or web page to be displayed at the client device, with different tabs corresponding to different submenus or to user interfaces for different vehicle systems. As an example, a tab may be provided for a navigation system, a multimedia system, a communication system, a telemetry system, or the like.

The data connection may be a wireless local area network (WLAN) connection. The control instructions may be transmitted by using Transmission Control Protocol/Internet Protocol (TCP/IP). Other types of connections are also conceivable, such as for example a Bluetooth™ connection or other types of data connections. The wireless transmission of data via such a connection may enable the placement of the vehicle computing device at any suitable position inside the vehicle.

The computing device may be configured to receive authorization data from the client device. The control instruction may then only be transmitted to the client device if the authorization data corresponds to a predetermined authorization. Fraudulent use of the vehicle computing device and its associated vehicle systems may thus be prevented.

The authorization data may be used at the vehicle computing device to identify a particular user. As an example, user-specific settings for the vehicle system and/or user-specific access to the vehicle system may be provided in accordance with a user profile identified by the authorization data. A time consuming adjustment of one or more vehicle systems may thus be avoided. As each user may have their own mobile client device, authorization can be fast and efficient, enabling a fast setting of user preferences and access to user-specific data, e.g. navigation-related data, such as for example routes, address data of a communication system or music or video data of a multimedia system.

The control instructions provided by the vehicle computing device for transmission to the client device may include control instructions configured to assign at least one function of the vehicle system to a mechanical control element of the client device. While some client devices may only comprise a touchscreen and a small number of mechanical control elements, others may comprise a larger number of control elements, e.g., number keys or even a full-sized keyboard. When the application at the client device interprets the above-mentioned control instructions, it assigns particular functions of the vehicle system to such keys provided on the client device. As an example, a volume adjustment control element on a client device may be assigned a function to control the volume of the vehicle's multimedia system.

The vehicle system may at least partially be implemented by an application running on the processing unit of the vehicle computing device. The processing unit may for example execute software code portions of the vehicle system, with further components of the vehicle system being comprised in the vehicle computing device or interfaced by the vehicle computing device. Other vehicle systems may only interface the vehicle computing device in order to be provided with a user interface by the vehicle computing device.

The vehicle system may be selected from a group comprising a vehicle navigation system, a vehicle multimedia system, a vehicle communication system, a driver assistance system, a vehicle infotainment system, a vehicle information system and a vehicle telemetry system. Such systems may benefit from the vehicle computing device providing a user interface via the mobile client device.

Another embodiment relates to a method of providing a user interface for a vehicle system for controlling at least one function of the vehicle system. In the method, a vehicle computing device communicates with a mobile client device over a wireless data connection. In the vehicle computing device, control instructions comprising instructions for displaying at least one graphical control element at a client device for controlling the at least one function of the vehicle system are provided. The control instructions are configured such that they can be interpreted by a platform independent application operable on a client device. The vehicle computing device is configured such that the vehicle computing device transmits the control instructions via the wireless data connection to a client device in response to receiving a request for user interface data from the client device.

The step of configuring the control instructions may be performed such that the control instructions define a structured document.

The step of configuring the control instructions may be performed such that the control instructions define the contents of a web page. The platform independent application can be a web browser.

The step of configuring the vehicle computing device comprises providing a web server on the computing device. The request for user interface data can be a request message from a web client operated on the client device, and the control instructions may be configured to include a response message from the web server to the web client of the client device.

A step of configuring the vehicle computing device so as to receive from the vehicle system information to be given out to the user may also be provided. The step of configuring the control instructions may be performed such that the control instructions include control instructions for displaying the received information at the client device.

In a further step, the vehicle computing device may be configured as mentioned above.

Another aspect relates to a method of operating a vehicle computing device for providing a user interface to a vehicle system in order to control at least one function of the vehicle system. The vehicle computing device communicates with a mobile client device over a wireless data connection. The vehicle computing device receives a request to provide user interface data for controlling the at least one vehicle system from the client device via the wireless data connection. In response to the request, control instructions are transmitted via the wireless data connection to the client device. The control instructions comprise instructions for displaying at least one graphical control element at the client device for controlling the at least one function of the vehicle system. The control instructions are configured such that they can be interpreted by a platform independent application running on the client device. Furthermore, input data is received from the client device, the input data comprising a detected user input corresponding to an actuation of the graphical control element detected by the client device. The input data is for example received from the client device in response to a user of the client device actuating the graphical control element. In a further step the received user input is provided to the vehicle system, whereby the control of the function of the vehicle system via the client device is enabled.

The embodiment may further comprise any of the steps mentioned above.

The embodiment may also further perform the steps at the client device of: receiving the control instructions transmitted by the computing device; interpreting the control instructions using the platform independent application running on the client device, wherein image data comprising the at least one graphical control element is generated, and displaying the generated image data. A user may now actuate the graphical control element, e.g., by a particular key, a cursor, a touchscreen or the like. The actuation of one of the displayed graphical control elements by a user may then be detected as a user input and input data comprising the detected user input may be transmitted to the vehicle computing system. The image data may for example correspond to a web page which is displayed at the mobile client device.

A computer program product that can be loaded into the internal memory of a computing device is provided, the product comprising software code portions for performing any of the methods mentioned above. The disclosure also relates to an electronically readable data carrier with stored electronically readable control information configured such that when using the data carrier in a computing device, the control information performs one of the methods mentioned above.

It is to be understood that the features mentioned above and those yet to be explained below can be used not only in the respective combinations indicated, but also in other combinations or in isolation, without leaving the scope of the present invention.

These and other objects, features and advantages of the present invention will become apparent in light of the detailed description of the best mode embodiment thereof, as illustrated in the accompanying drawings. In the figures, like reference numerals designate corresponding parts.

DESCRIPTION OF THE DRAWINGS

The foregoing and other features of the disclosure will become further apparent from the following detailed description of illustrative embodiments when read in conjunction with the accompanying drawings.

DETAILED DESCRIPTION OF THE INVENTION

Figure 1:
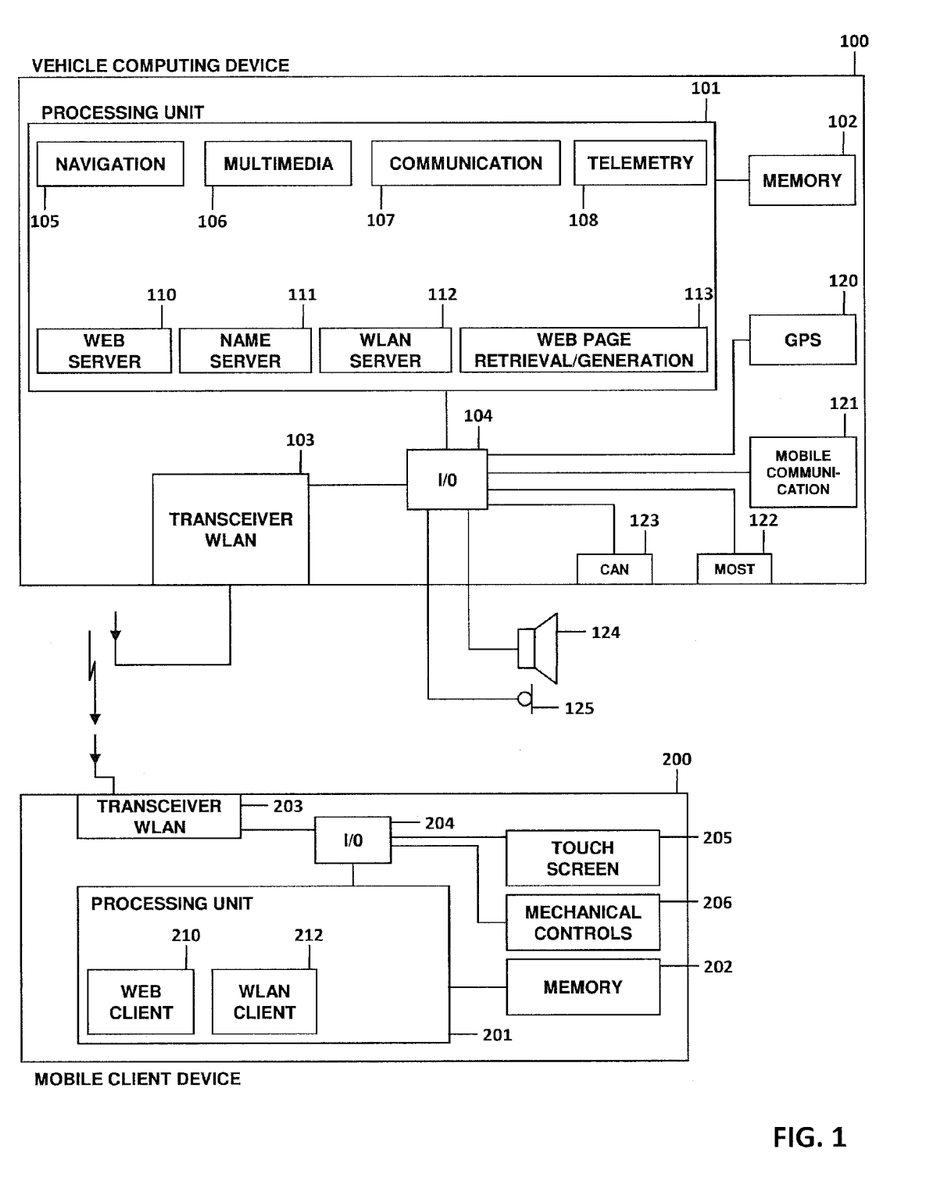
FIG. 1 is a block diagram illustration of a vehicle computing device and a mobile client device.

FIG. 1 is a block diagram illustration of a vehicle computing device 100 and a mobile client device 200. The vehicle computing device 100 may be implemented as a vehicle head unit, a computing unit of a vehicle infotainment system or the like, and comprises a processing unit 101 that controls the operation of the vehicle computing device in accordance with executable program instructions stored in memory 102. The processing unit 101 may comprise a central processing unit (CPU), for example one or more microprocessors, application-specific integrated circuits (ASICs), digital signal processors (DSPs) and the like. The memory 102 may comprise for example all types of memory, such as random access memory, flash memory, a hard drive and the like.

The vehicle computing device 100 may itself implement one or more vehicle systems or may interface one or more vehicle systems. Implementing a vehicle system means that the vehicle computing device 100 is operating as a computing unit for the particular system, e.g., by running an application on the processing unit 101 relating to the particular vehicle system. Each vehicle system may also comprise components that can be part of the vehicle computing device 100 or which may be interfaced by the vehicle computing device, e.g., via input/output unit 104, a controller area network (CAN) interface 123, a media-oriented systems transport (MOST) interface 122 or the like.

In the example of FIG. 1 the vehicle computing device 100 implements a navigation system 105, a multimedia system 106, a communication system 107 and a telemetry system 108. For this purpose, the processing unit 101 operates corresponding applications, in particular a navigation application, a multimedia application, a communication application and a telemetry application. The applications may be run individually or in parallel, as different processes on the processing unit 101. Software code portions for running these applications may be stored in the memory 102, and are retrieved by the processing unit 101. In FIG. 1 the systems are schematically illustrated as functional units of the processing unit 101. It should be clear that this is only a schematic representation and that the systems may comprise additional components as detailed below.

The processing unit 101 interfaces with the GPS (Global Positioning System) sensor 120, which provides current position information, via the input/output unit 104. The current position information together with map data, which may be retrieved from a map database in the memory 102, can be used by the navigation system 105 to generate image data comprising a map section and the vehicle's current position to be given out to a user. The multimedia system 106 may be operated by a user to play back media contents, such as an audio file or a video file, e.g., provided on a CD or DVD comprised in the memory 102, or a radio station or the like by one or more loudspeakers 124 mounted in the vehicle and interfaced via the unit 104. Multimedia contents may also be received or given out via the MOST interface 122.

The communication system 107 may be controlled by a user of the vehicle computing device 100 to establish a mobile phone connection via mobile communication unit 121. The connection can be established to any type of mobile communication network, such as a Global System for Mobile Communications (GSM), UMTS or Long Term Evolution (LTE) network. A user may then communicate with a called or calling party via a microphone 125 and a loudspeaker 124 mounted inside the vehicle. The telemetry system 108 may retrieve, e.g., via the CAN interface 123, vehicle telemetry data, such as a current fuel consumption, fuel remaining in the tank, the vehicle's current velocity, status of vehicle components and vehicle auxiliary devices and the like. The telemetry application may generate a corresponding output comprising such information that is to be displayed to a user.

The vehicle computing device 100 thus operates or controls the operation of a range of different vehicle systems, which generally require user input and provide information to a user. The communication system 107 may for example provide contact details for displaying and may receive a telephone number or the selection of a particular contact as user input, whereas the telemetry system 108 may receive a selection of telemetry data that is to be displayed and provide the corresponding data for displaying.

It should be clear that the computing device 100 may only implement a single vehicle system, or more or fewer systems than shown in FIG. 1.

Vehicle computing devices can comprise a display of a relatively large size for displaying the information provided by the vehicle systems, and mechanical control elements for controlling the functions of the vehicle systems, where the display and the mechanical control elements serving as a user interface. In the embodiment illustrated in FIG. 1, the vehicle computing device 100 preferably neither comprises a display nor mechanical control elements. However, it is contemplated that in other implementations a display and/or one or more mechanical control elements may be provided. Due to the lack of such a user interface having a display, the vehicle computing device 100 may be mounted at any suitable position inside the vehicle. As it does not comprise a display, its mounting position can be moved from the center console to a different position. In particular, it can be mounted at a hidden or not easily accessible position in the vehicle, so as to prevent a theft of the vehicle computing device.

Instead of providing a physical user interface, the vehicle computing device 100 provides a user interface by transmitting user interface data to a mobile client device 200 and receiving from the mobile client device 200 user input data, indicating the occurrence of a particular user input, such as the selection of a graphical control element, the adjustment of a parameter or the like. The data may be transmitted by a wireless data connection established between a transceiver 103 of the vehicle computing device 100 and a transceiver 203 of the mobile client device 200. In the embodiment illustrated in FIG. 1, wireless local area network (WLAN) transceivers, e.g., in form of a WLAN module or the like, are provided for establishing a WLAN connection. In other embodiments, other types of transceivers may be used, e.g., for establishing a Bluetooth™ connection or the like. In the embodiment of FIG. 1 the vehicle computing device 100 provides a WLAN access point to which the mobile client device 200 connects. For establishing a network connection between the devices 100 and 200, the processing unit 101 operates a WLAN server application 112, and a processing unit 201 of the mobile client device 200 operates a WLAN client 212 which requests the establishment of the network connection.

When establishing the wireless network connection, an authentication procedure may be performed at the vehicle computing device 100 to ensure that the mobile client device 200 is authorized to connect to the wireless network. Any known authorization procedure, such as Wi-Fi-Protected Access (WPA) or WPA2 or the like may be used. Authorization may also occur at a later stage, e.g., by the transmission of a user name and a password or the like. It can Thus an unauthorized person can be prevented from gaining control of the vehicle computing device 100.

The WLAN data connection between the transceivers 103 and 203 may enable the transfer of data using TCP/IP protocols. Thus, a fast and bidirectional exchange of data is enabled.

For realizing the use of the mobile client device 200 as a user interface, the processing unit 101 transmits control instructions over the wireless data connection to the client 200. The control instructions define graphical control elements and/or information provided by one of the vehicle systems to be displayed at the client device 200. The control instructions are received by the client device and are interpreted by a platform independent application running on the processing unit 201 of the client device 200. Platform independent application means that irrespective of the platform on which the application runs, it can interpret the control instructions and generate a corresponding display output. It may also be termed platform independent interpreter. The same control instructions can thus be provided to any type of device running the application, leading to a similar output on the display of each of the devices (of course depending on display size and resolution).

The processing unit 201 controls the operation of the mobile client device 200 according to programs stored in the memory 202. When interpreting the received control instructions, the processing unit 201 generates display data comprising the graphical control elements and/or the information comprised in the control instructions, and transmits the display data to the display 205. The display 205 is preferably a touchscreen in the embodiment of FIG. 1.

The control instructions define a structured document, in particular a web page, preferably according to the HTML5 standard. This enables embedding of control elements and visualization elements directly into the web page. HTML5 also enables real time operation of control elements, such as sliders, by which parameters of a vehicle system may be adjusted in real time (e.g., sliders for adjusting parameters of an audio system, such as equalizers or the like).

The control instructions defining a web page can be stored in the memory 102 and be retrieved therefrom, or they may be dynamically generated, for which the functional unit 113 is provided. For certain vehicle systems, certain submenus, certain functions or the like, the memory 102 may store preconfigured control instructions, such as preconfigured web pages. This is particularly useful if the control elements and information provided on the respective web page is static, which can for example be the case for a main menu of the vehicle computing device or of any of the vehicle systems, for particular submenus or the like. In other cases, current information may need to be given out to a user, such as current date and time, current vehicle position, current settings of the audio system, contents of a particular storage medium and the like. For this purpose, the functional unit 113 dynamically generates the control instructions. It may for example retrieve from the memory 102 a web page template stored thereon, which may comprise instructions for calling a service or application for retrieving information, e.g., one of the applications of the vehicle systems 105-108. The template itself may thus comprise instructions for the dynamic generation of the web page. As an example the web page template may comprise an embedded object for displaying map data, which is received from the application of the navigation system 105 and included in the generated web page. A web page may also include an object that requires the streaming of data, i.e., a continuous transmission of data to be displayed from the vehicle computing device to the mobile client device. For assembling the web page, the unit 113 may run any type of runtime environment, such as a JAVA virtual machine or the like. The retrieved or the generated web pages may correspond to the display images that are generally given out to a user by the vehicle systems 105-108. The control instructions in farm of the so generated or retrieved web pages are provided by a web server 110 operated on the processing unit 101 for retrieval. The web server 110 and the unit 113 may also be provided in one functional unit. The web server 110 may comprise a hypertext transfer protocol (HTTP) server.

The processing unit 201 operates a platform independent application 210 that is in the example of FIG. 1 a web client, in particular a web browser. The web browser 210 may download from the web server 110 of the vehicle computing device 100 the retrieved or generated web page and display its contents on the display 205. The web client 210 interprets the control instructions comprised in the downloaded web page for displaying the control elements and the static or dynamic information provided by the control instructions on the display 205. The web client 201 may thus be configured to work according to the HTML5 standard The received information is thus visualized and the user of the client device 200 is enabled to select or adjust one of the graphical control elements on the touchscreen 205 or the mechanical controls 206 provided on the client device. The mechanical controls 206 may be operated to select and activate a graphical control element for example via a cursor, or the downloaded web page may comprise instructions for assigning functions to be controlled directly to the one or more mechanical control elements 206. As an example, shortcuts for selecting particular menu items or the like may be assigned to numerical or alphabetic keys, volume control of one of the vehicle systems may be assigned to a volume control element of the client device and the like.

The selection, activation or adjustment of a function by actuating a graphical control element or the mechanical control is detected by the client device and corresponding input information is transmitted to the vehicle computing device 100, again making use of the web client 210 and the wireless data connection. A real time operation of some control elements can also be realized, in which case the client device 200 continuously transfers input information to the vehicle computing device 100. The web server 110 receives the input data and provides the corresponding user input to the respective vehicle system application. The user may thus effectively control the vehicle systems by the touchscreen 205 and the mechanical controls 206 of the mobile client device 200.

Any type of mobile device equipped with a WLAN module and operating a web browser may be operated as a user interface for the vehicle computing device 100 and its associated vehicle systems 105-108. As a web browser is used that works according to a predefined standard, the operation and the information display is relatively independent of the type and the manufacturer of the mobile client device. As the user input can mainly occur via the touchscreen 205, common control elements such as volume control, turn/push buttons, keys, and the like that are generally connected to the vehicle computing device can be omitted. As the communication occurs wirelessly, the mobile client device 200 may be placed at any desired position inside the vehicle. This is a very flexible solution, as the user can adjust the position and angle of the user interface according to his needs.

Furthermore, due to the authorization procedure, it is possible to provide user-specific settings for the individual vehicle systems, or to enable the access to user-specific data stored in the memory 102. Each user may for example have a personal storage space in the memory 102 for storing contact information of the communication system, audio or other files of the multimedia system and the like. As each user may use his own mobile client device, the authorization procedure can be performed automatically, and user settings or user access can be retrieved or granted, respectively, without any further user interaction. It should be clear that authorization may not only occur upon establishing the network connection, but additionally or alternatively when the web client is accessing the web server for retrieving the control instructions. It may thus be a web page based authorization.

The vehicle computing device 100 may be configured as described above by providing the above mentioned hardware components and by providing program instructions in the vehicle computing device for enabling the above described operation. The program instructions can be stored in the memory 102 and can be executed by the processing unit. The vehicle computing device 100 may thus be configured to provide the control instructions for the user interface detailed above and further below by providing the vehicle computing device with the corresponding programming Similarly, the functional units shown in the processing unit 101 may at least partially be realized by providing corresponding program instructions to the processing unit 101.

The mobile client device 200 may for example be a smartphone, a mobile phone, a PDA, a tablet or laptop computer, a portable music player or the like. It is contemplated that any device capable of establishing the wireless data connection and retrieving the control instructions by the platform independent application may be used as a client device.

While in the above description, the control instructions are provided in form of a web page, it should be clear that other implementations may also be used. For example, formats other than HTML in which the control instructions may be provided include JAVA, flash, JAVA script, and the like. Client devices, such as a tablet PC (e.g., an iPad™ tablet), can display the information clearly and comprehensively. The operation by touchscreen facilitates the user input. The menu structures can be adapted to fit the particular display screen size and can furthermore be adapted to the particular user. As the vehicle computing device 100 does not need to comprise a display and mechanical control elements, it can be produced more cost-efficiently. Even earlier models of smartphones with little processing power and other mobile devices may be used as the client, as slight delays are acceptable for visualization and user input.

Figure 2A:
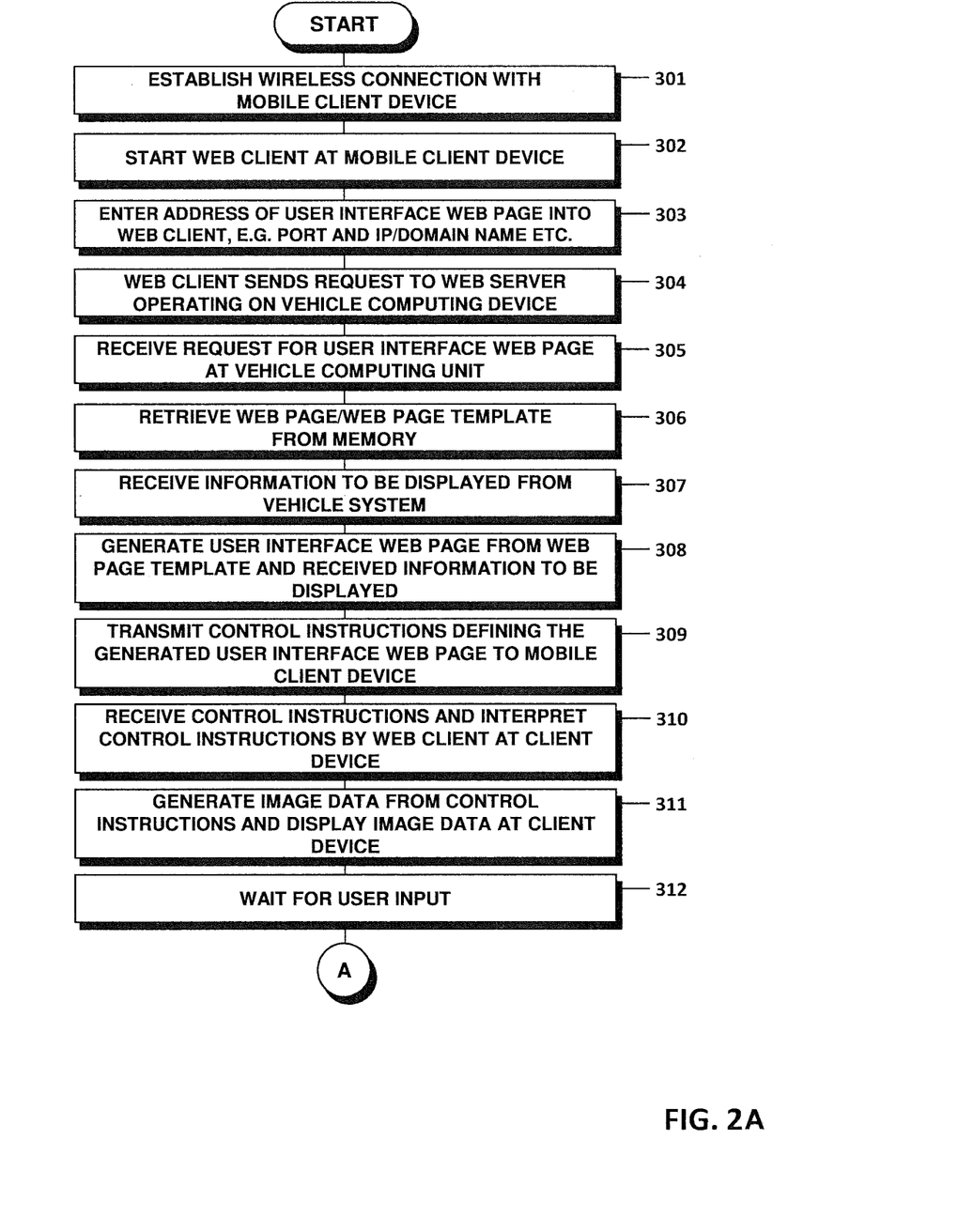
FIGS. 2A-2B together are a flow diagram illustration of operating a vehicle computing device for providing a user interface to a vehicle system.
Figure 2B:
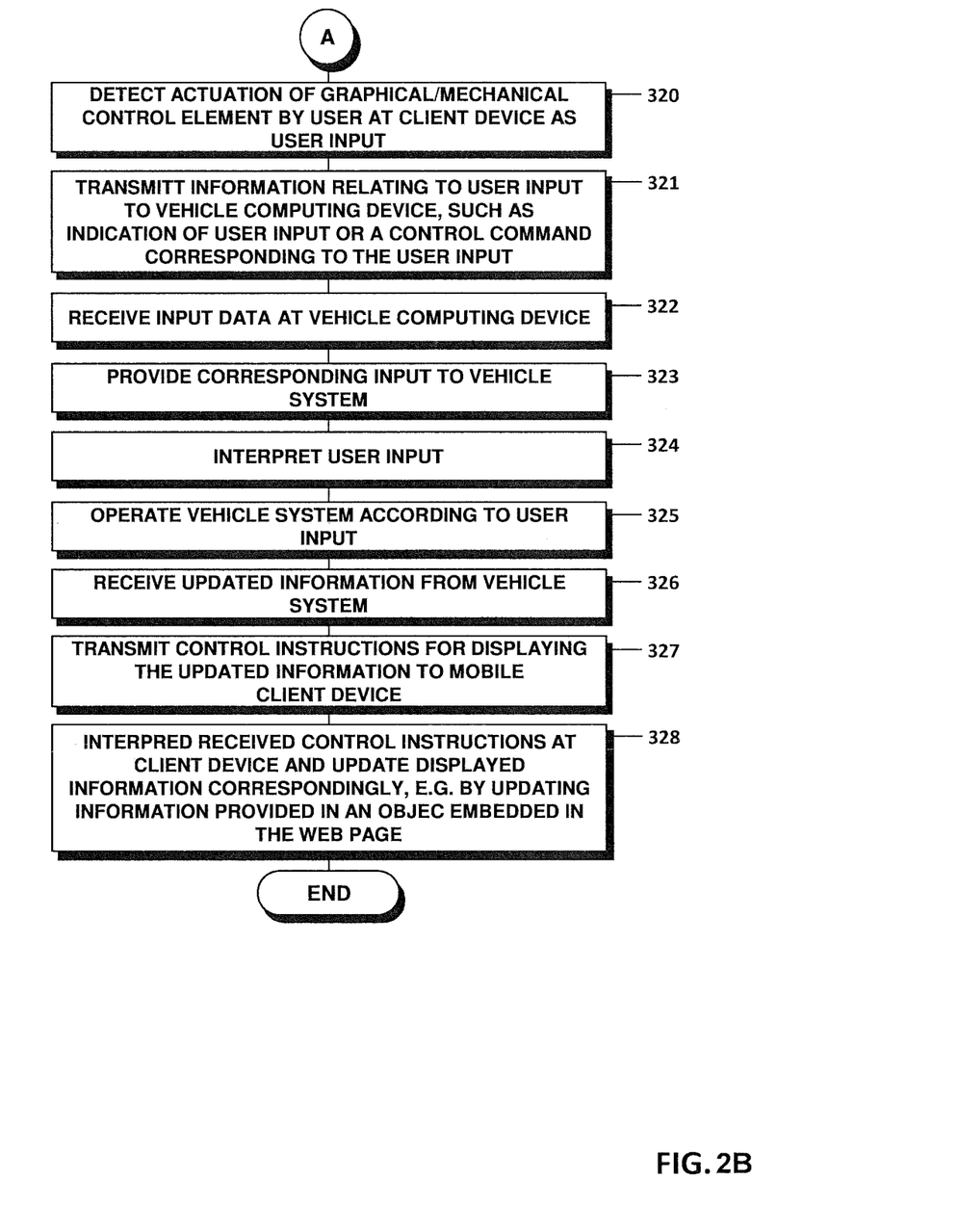

FIGS. 2A-2B together are a flow diagram illustration of method steps that may be performed by the vehicle computing device 100 or the client device 200. In a first step 301 of FIG. 2A, the computing device 100 establishes a wireless connection with the client device 200. Connection setup can occur according to any known WLAN setup procedure and may include an authorization procedure. In step 302, the web client or web browser is started at the mobile client device. This may of course also occur before establishing the wireless data connection. In step 303 the address of the web page providing the user interface is entered into the web client 210 (FIG. 1) of the client device. This may for example be a port number and an IP address. The vehicle computing device 100 may also be provided with a name server 101, translating an IP address into a domain name. Accordingly, entering of the domain name into web client 210 may also be possible for accessing the user interface web page. The address for accessing the user interface web page may be stored in the client device 200 to facilitate the retrieval thereof (e.g. as a "favorite" or a "bookmark"). After entering the address, the web client 210 sends a request to the web server 110 over the established data connection for downloading the corresponding web page providing the user interface. In step 305, the request for the user interface web page is received at the vehicle computing unit, in particular by the web server 110.

The requested web page is either retrieved from the memory 102 by the unit 113, or the unit 113 dynamically generates the web page, e.g., from a web page template retrieved from the memory 102 (step 306). When dynamically generating the web page, the unit 113 receives information to be displayed from one of the vehicle systems 105-108 in step 307. From the web page template and the received information the user interface web page is generated in step 308. In particular, the control instructions that define the web page are assembled, and the control instructions defining the generated user interface web page are transmitted in step 309 to the mobile client device 200. At the device 200 (FIG. 1), the control instructions are received, and are interpreted by the web client 210 in step 310. The processing unit 201 then generates image data from the control instructions, which are displayed by the touchscreen 205 at the client device in step 311. In step 312, the client device waits for a user input.

Figure 3:
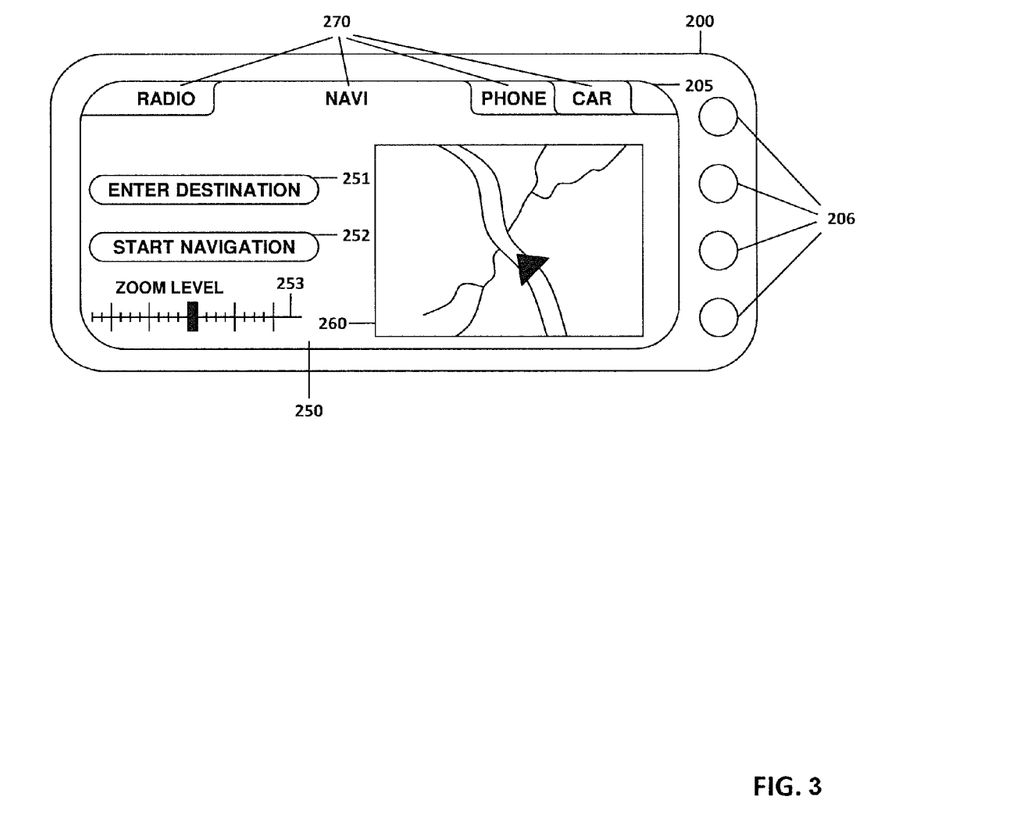
FIG. 3 pictorially illustrates a user interface displayed at a mobile client device in accordance with control instructions received from the vehicle computing device.

An example of such generated image data displayed at the client device 200 is illustrated in FIG. 3. In the example of FIG. 3, the touchscreen 205 shows a web page 250 that comprises graphical control elements 251, 252 and 253 and an embedded graphical object 260. In the example of FIG. 3, the web page 250 provides a user interface for the navigation system 105. The user can control different functions of the navigation system via the graphical control elements, here the entering of a destination (element 251), the starting of a route guidance (element 252) or the adjustment of a zoom level (element 253) of the map displayed in the embedded graphical object 260.

The arrow in the embedded object illustrates the current position of the vehicle. The map data may be continuously streamed from the vehicle computing device so as to always display the current map section. Besides an embedded object, the web page may simply comprise an image for displaying the map. The web page 250 may also enable a real-time operation of the slider 253, so that the zoom level of the displayed map section can be adjusted with only a relatively slight delay. Input data comprising the setting of the zoom level may for example continuously be transmitted to the vehicle computing device and in particular to the application of the navigation system 105 (FIG. 1), which in response sends map data to be visualized to the unit 113 for being included in the web page or directly to the web server 110 for being streamed to the client device.

In the example of FIG. 3 the control instructions define a web page that has several tabs 270. The tabs may be provided for submenus, for different vehicle systems, for particular functions and the like. In the present example, four tabs are provided for the four vehicle systems 105-108. The radio tab comprises a user interface for the multimedia system 106, the phone tab a user interface for the communication system 107 and the car tab a user interface for the telemetry system 108. The menu structure and the positioning of the control elements depends of course on the particular application and the vehicle systems to be controlled. The touchscreen 205 enables a fast and intuitive activation of graphical control elements, e.g., the changing between the tabs 270, activation of a button 251 or 252, movement of the slider 253 and the like. The control instructions may directly associate one of the mechanical controls 206 with a particular function. The control elements 206 may be assigned with functions for controlling the displaying of the map, e.g., zooming and panning the map.

Now turning to FIG. 2B, the method continues in step 320 with the detection of an actuation of a graphical or mechanical control element by a user at the client device. Information relating to such a detected user input is transmitted to the vehicle computing device in step 321. The transmitted input data may comprise an indication that a particular control element was actuated, the setting of a particular control element, such as a slider, a user input in form of coordinates, e.g., when the user points to a particular position on the map and the like. It is also possible to directly interpret a user input at the client device and to transmit a corresponding control command as user input with the input data to the computing device.

The input data is received at the vehicle computing device in step 322. The detected user input received with the input data is generally provided to the corresponding vehicle system where the user input is interpreted (steps 323 and 324). It is also possible to interpret a user input at the web server 110, and provide the corresponding information to the respective vehicle system.

The vehicle system is operated according to the user input in step 325. As an example, if the user pushes the start navigation button 252 on the touchscreen 205, the navigation system 105 may start a route calculation and a route guidance along the calculated route. As another example, if the user pans the map 260 (e.g., using his finger), new map coordinates may be provided to the navigation system 105, which retrieves and assembles a corresponding map section for displaying. Accordingly, the vehicle system can provide an updated information in step 326 which is received by the unit 113 that generates corresponding updated control instructions. The updated control instructions are transmitted in step 327 to the mobile client device for displaying the updated information. If the information to be displayed comprises, for example, updated map data or video frames, it may also be directly streamed to the client device via the web server 110.

The received updated control instructions are interpreted in step 328 at the client device and the displayed information is updated correspondingly. As an example, the embedded object 260 may be updated with a new map section.

The method thus achieves an effective control of the vehicle computing device 100 and its associated vehicle systems by the mobile client device 200. While the method has again been described with respect to control instructions defining a web page, it should be clear that the control instructions may have any other suitable format as mentioned above. While in some embodiments, data may only be transmitted between the vehicle computing device and the mobile client device upon request or upon a particular trigger, such as the activation of a control element, user interface data or input data may be continuously streamed between the two devices in other embodiments. The display 205 may for example be continuously updated. It should understood that the graphical control elements are not restricted to graphical buttons, sliders or the like, but may also include all other types of graphical controls. As an example, the embedded object 260 displaying a map section may also be considered a graphical control element, as it may be used to pan the map, e.g., by positioning a finger on a particular map location and dragging the finger across the touchscreen 205.

The disclosure includes an improved vehicle computing device that makes use of a mobile client device as a user interface. This makes the placement of both the vehicle computing device and the user interface in form of the mobile client device inside the vehicle more flexible. In particular, space on the center console of the vehicle can be saved. As the vehicle computing device does not need to be equipped with a screen and mechanical controls, manufacturing costs can be reduced.

Although the present invention has been illustrated and described with respect to several preferred embodiments thereof, various changes, omissions and additions to the form and detail thereof, may be made therein, without departing from the spirit and scope of the invention.

What is claimed is:

1. A vehicle computing device adapted to provide a user interface to a vehicle system to control at least one function of the vehicle system, comprising:
    a transceiver adapted to wirelessly communicate with a mobile client device over a wireless data connection;
    a processing unit that communicates with the mobile client device via the transceiver, where the processing unit (i) receives from the client device via the wireless data connection a request to provide user interface data for controlling the vehicle system, (ii) transmits control instructions via the wireless data connection to the client device, the control instructions comprising instructions for displaying at least one graphical control element at the client device to control the at least one function of the vehicle system, wherein the control instructions are interpreted by a platform independent application running on the client device, (iii) receives input data from the client device comprising a detected user input corresponding to an actuation of the graphical control element detected by the client device, (iv) provides the user input to the vehicle system to enable control of the at least one function of the vehicle system by the client device, and (v) receives from the vehicle system information to be given out to the client device and includes in the control instructions to be transmitted to the client device control, instructions for displaying the received information at the client device: and
    a web server operated by the processing unit, the control instructions defining contents of a web page provided by the web server,
    where the request received from the client device comprises a request message from a web client operated on the client device to the web server, the processing unit being configured to include the control instructions in a response message to be transmitted from the web server to the web client of the client device,
    where the control instructions comprise instructions in one of a HyperText Markup Language (HTML) format and a JAVA format, and
    where the control instructions further comprise control instructions to assign at least one function of the vehicle system to a mechanical control element of the client device.

2. The vehicle computing device of claim 1, where the processing unit provides the control instructions such that the control instructions define a structured document.

3. The vehicle computing device of claim 1, where the data connection is a wireless local area network connection.

4. The vehicle computing device of claim 1, where the processing unit receives authorization data from the client device to transmit the control instructions to the client device only if the received authorization data corresponds to a predetermined authorization.

5. The vehicle computing device according to claim 1, where the processing unit receives authorization data from the client device and provides user specific settings for the vehicle system and user specific access to the vehicle system in accordance with a user profile identified by the authorization data.

6. The vehicle computing device of claim 1, where the vehicle system is at least partly implemented by an application running on the processing unit of the vehicle computing device.

7. The vehicle computing device of claim 1, where the vehicle system is selected from a group that includes a vehicle navigation system, a vehicle multimedia system, a vehicle communication system, a driver assistance system, a vehicle infotainment system, a vehicle information system, and a vehicle telemetry system.

8. The vehicle computing device of claim 1, where the processing unit receives from the vehicle system information to be given out to the user and includes in the control instructions to be transmitted to the client device control instructions for displaying the received information at the client device, without displaying the received information on a server side display.

9. A method of providing a user interface for a vehicle system for controlling at least one function of the vehicle system, the method comprising the steps of:
- providing a vehicle computing device configured to communicate with a mobile client device over a wireless data connection;
- providing in the vehicle computing device, control instructions comprising instructions for displaying at least one graphical control element at the client device to control the at least one function of the vehicle system;
- configuring the control instructions such that they can be interpreted by a platform independent application operable on the client device; and
- configuring the vehicle computing device such that the vehicle computing device transmits the control instructions via the wireless data connection to the client device in response to receiving a request for user interface data from the client device: and
- further comprising the step of configuring the vehicle computing device so as to receive from the vehicle system information to be given out to the client device, the step of configuring the control instructions being performed such that the control instructions include control instructions for displaying the received information at the client device,
- where the step of configuring the vehicle computing device further comprises the step of providing a web server on the vehicle computing device, where the request for user interface data includes a request message from a web client operated on the client device, where the control instructions are configured to be comprised in a response message from the web server to the web client of the client device, where the control instructions comprise instructions in one of a HyperText Markup Language (HTML) format and a JAVA format, and where the control instructions further comprise control instructions to assign at least one function of the vehicle system to a mechanical control element of the client device.

10. The method according to claim 9, where the step of configuring the control instructions is performed such that the control instructions define a structured document.

11. The method according to claim 9, where the step of configuring the control instructions is performed such that the control instructions define contents of a web page, the platform independent application being a web browser.

12. A method of operating a vehicle computing device for providing a user interface to a vehicle system to control at least one function of the vehicle system, the vehicle computing device being configured to communicate with a mobile client device over a wireless data connection, the method comprising:
- receiving from the client device via the wireless data connection a request to provide user interface data for controlling the vehicle system;
- transmitting control instructions via the wireless data connection to the client device, the control instructions comprising instructions for displaying at least one graphical control element at the client device for controlling the at least one function of the vehicle system, wherein the control instructions are interpreted by a platform independent application running on the client device;
- receiving input data from the client device comprising a received user input corresponding to an actuation of the graphical control element detected by the client device; and
- providing the received user input to the vehicle system, thereby enabling the control of the at least one function of the vehicle system by the client device,
- receiving from the vehicle system information to be given out to the client device and included in the control instructions to be transmitted to the client device for displaying the received information at the client device,
- where the step of configuring the vehicle computing device further comprises the step of providing a web server on the computing device, where the request for user interface data includes a request message from a web client operated on the client device, where the control instructions are configured to be comprised in a response message from the web server to the web client of the client device, where the control instructions comprise instructions in one of a HyperText Markup Language (HTML) format and a JAVA format, and where the control instructions further comprise control instructions to assign at least one function of the vehicle system to a mechanical control element of the client device.

13. The method according to claim 12, wherein the method further comprises performing the following steps at the client device:
- receiving the control instructions transmitted by the vehicle computing device; interpreting the control instructions via the platform independent application running on the client device to generate image data comprising the at least one graphical control element;
- displaying the generated image data;
- detecting the actuation of one of the displayed graphical control elements by a user as a user input; and
- transmitting input data comprising the detected user input to the vehicle computing device.

* * * * *